ELECTRODE CONTROL SYSTEMS OF A MULTI-NEEDLE ELECTRODE TYPE ELECTROSTATIC RECORDING DEVICE

Filed July 1, 1966 4 Sheets-Sheet 1

Kiyoshi Yamamoto

INVENTOR.

BY George B. Oujevolk

Attorney

INVENTOR.
Kiyoshi Yamamoto
BY George B. Oujevolk
Attorney

Sept. 23, 1969 KIYOSHI YAMAMOTO 3,469,028

ELECTRODE CONTROL SYSTEMS OF A MULTI-NEEDLE ELECTRODE TYPE ELECTROSTATIC RECORDING DEVICE

Filed July 1, 1966 4 Sheets-Sheet 3

INVENTOR.
Kiyoshi Yamamoto
BY
George B. Oujevolk
Attorney

Sept. 23, 1969 KIYOSHI YAMAMOTO 3,469,028

ELECTRODE CONTROL SYSTEMS OF A MULTI-NEEDLE ELECTRODE TYPE ELECTROSTATIC RECORDING DEVICE

Filed July 1, 1966 4 Sheets-Sheet 4

INVENTOR.
Kiyoshi Yamamoto

BY George B. Oujevolk
Attorney

United States Patent Office 3,469,028

Patented Sept. 23, 1969

3,469,028

ELECTRODE CONTROL SYSTEMS OF A MULTI-NEEDLE ELECTRODE TYPE ELECTROSTATIC RECORDING DEVICE

Kiyoshi Yamamoto, Yokohama-shi, Japan, assignor to Tokyo Shibaura Electric Co., Ltd., Kawasaki-shi, Japan, a corporation of Japan Filed July 1, 1966, Ser. No. 562,225
Claims priority, application Japan, July 5, 1965, 40/40,275
Int. Cl. H04n 5/76
U.S. Cl. 178—6.6 2 Claims

ABSTRACT OF THE DISCLOSURE

An electrode control system of a multi-electrode type electrostatic recording device has a resistance coupling network including a plurality of first resistors and the same number of second resistors, one end of each pair of said first and second resistors being connected to its corresponding needle electrode. A first high voltage pulse generator is provided to distribute and impress a high voltage pulse to the common junctions of said first resistors to cause the needle electrodes to effect the main scanning function. A second high voltage pulse generator is provided to distribute a high voltage pulse to the other ends of said second resistors at a higher speed than said first high voltage pulse generator. Means are provided to simultaneously apply a facsimile signal to both said first and second high voltage pulse generators thereby to divide said facsimile signal among said first and second high voltage pulse generators and impress it to the needle electrodes as an electrostatic recording high voltage pulse signal through said resistance network and at the different distributing speeds. Thus, needle electrodes having been impressed with the high voltage pulses simultaneously from said first and second generators can record an electrostatic latent image on a recording film.

This invention relates to a multi-needle type electrode system wherein an electrostatic recording signal is impressed upon a plurality of needle electrodes to record an electrostatic latent image on an electrostatic recording film which is held to face the electrodes, and relates more particularly to improvements relating to a control system for such electrodes.

Such a multi-needle electrode type electrostatic recording device is one type of electrostatic recording devices and is widely used at present as a facsimile receiver or a printing machine of an electronic computer and the like. Generally an electrode for use in a multi-electrode type electrostatic recording device comprises a plurality of needle electrodes and a back electrode opposing these electrodes so that the needle electrodes are often termed as surface electrodes. In order to obtain a record of an electrostatic latent image, an electrostatic recording film including an electrostatic recording sheet, a high resistance resinous film, a resinous film backed with a thin conductive layer and the like is interposed and caused to run between the needle electrodes and the surface electrode and concurrently therewith a recording signal is impressed across these electrodes thereby to charge a static charge on the recording surface of said recording film, thus forming an electrostatic latent image. Then a developing toner which is charged to have a polarity with respect to the electrostatic latent image is dusted upon the recording surface of the electrostatic recording film on which the electrostatic latent image has been formed in the manner described above, thus developing or visualizing the latent image. The developed image is then fixed by heat or chemical action. A high voltage signal of at least 600 v. or more is generally required to record the electrostatic latent image. In prior art devices, a large number of high voltage pulse amplifiers of the same number as that of the needle electrodes are required in order to control the distribution and application of the high voltage signal to said multi-needle electrodes, thus greatly complicating the electronic circuit. Accordingly, a back electrode control system has been developed wherein a predetermined number of needle electrodes are grouped into individual groups, these plurality of groups are arranged in a straight line, a back electrode is disposed to oppose each group of needle electrodes and wherein a recording pulse voltage is impressed upon the needle electrode groups in synchronism with the application of voltage for selecting the recording position upon the back electrodes. However, such a back electrode control system has been developed for use as an electrostatic printing machine but has been disadvantageous in that an extremely high accuracy is required in the opposed relative positions between the back electrodes and needle electrodes and that undesired spontaneous records are made by an electric leakage caused by adverse conditions of temperature and moisture. Also in facsimile receivers recording signals in the form of high voltage pulses are distributed and impressed on several hundreds of needle electrodes arranged in a straight line. Where an electronic distributor circuit comprising a combination of flip-flop circiuts, diode AND circuits and other circuit component is utilized as the distributor means, it is necessary to use in the output circuit an extremely large number of high voltage pulse amplifiers corresponding to the number of needle electrodes. Where a mechanical distributor including concentric contact terminals of the same number as the multi-needle electrodes is employed as the distributor for the purpose of decreasing the number of such high voltage pulse amplifiers required, it is very difficult to concentrically arrange more than several hundreds of contact terminals from the standpoint of fabrication, which also results in an increase in the physical dimensions of the distributor and hence of the entire recording device, thus causing it to be uneconomical.

In these prior art electrode control systems for electrostatic recording devices, when a high voltage signal pulse for recording is being impressed upon a certain needle electrode the electrodes adjacent thereto are at zero potential. As a result there is a liability of creating electric discharges between adjacent needle electrodes. In addition, an electrode holder in which more than several hundreds needle electrodes are embedded and maintained in position should have sufficiently high electric insulating property.

It is the principal object of this invention to provide a new and improved electrode control system for multi-needle electrode type electrostatic recording devices capable of eliminating various defects of the prior art systems described above.

A further object of this invention is to provide an improved electrode control system for multi-needle electrode type electrostatic recording devices having a smaller number of mechanical or electric circuit components.

According to this invention, there is provided an electrode control system for a multi-needle electrode type electrostatic recording device, comprising a plurality of needle electrodes which are mounted on a structure of the electrostatic recording device in contact with or in close proximity to the recording surface of an electrostatic recording film whereby electrostatic records are provided on said recording surface, a single back electrode arranged to oppose said needle electrodes with the recording film interposed between these electrodes, said back electrode being maintained at a reference potential, and a resistance coupling network including a plurality of first resistors, each having one terminal connected to each of needle electrodes, and a plurality of second resistors each also having one terminal connected to each of needle electrodes. Said first resistors are divided into several groups, each containing a predetermined number of resistors, according to the order of arrangement of the needle electrodes, and the other terminals of the resistors of each group are connected together. The second resistors of the resistance network are also divided into groups, each including a predetermined number of resistors, according to the order of arrangement of the needle electrodes, and the opposite terminals of resistors of each group are also connected together, and a pair of output terminals of a high voltage pulse signal generator are respectively connected to common junctions of the first and second resistors whereby the needle electrodes are controlled to record an electrostatic latent image on the recording film only by needle electrodes which are simultaneously supplied with a high voltage pulse signal from the pulse generator.

While the specification concludes with claims particularly pointing out and distinctly claiming the subject matter which I regard as my invention, it is believed that the invention will be better understood from the following description taken in connection with the accompanying drawings, in which:

Figure 3:
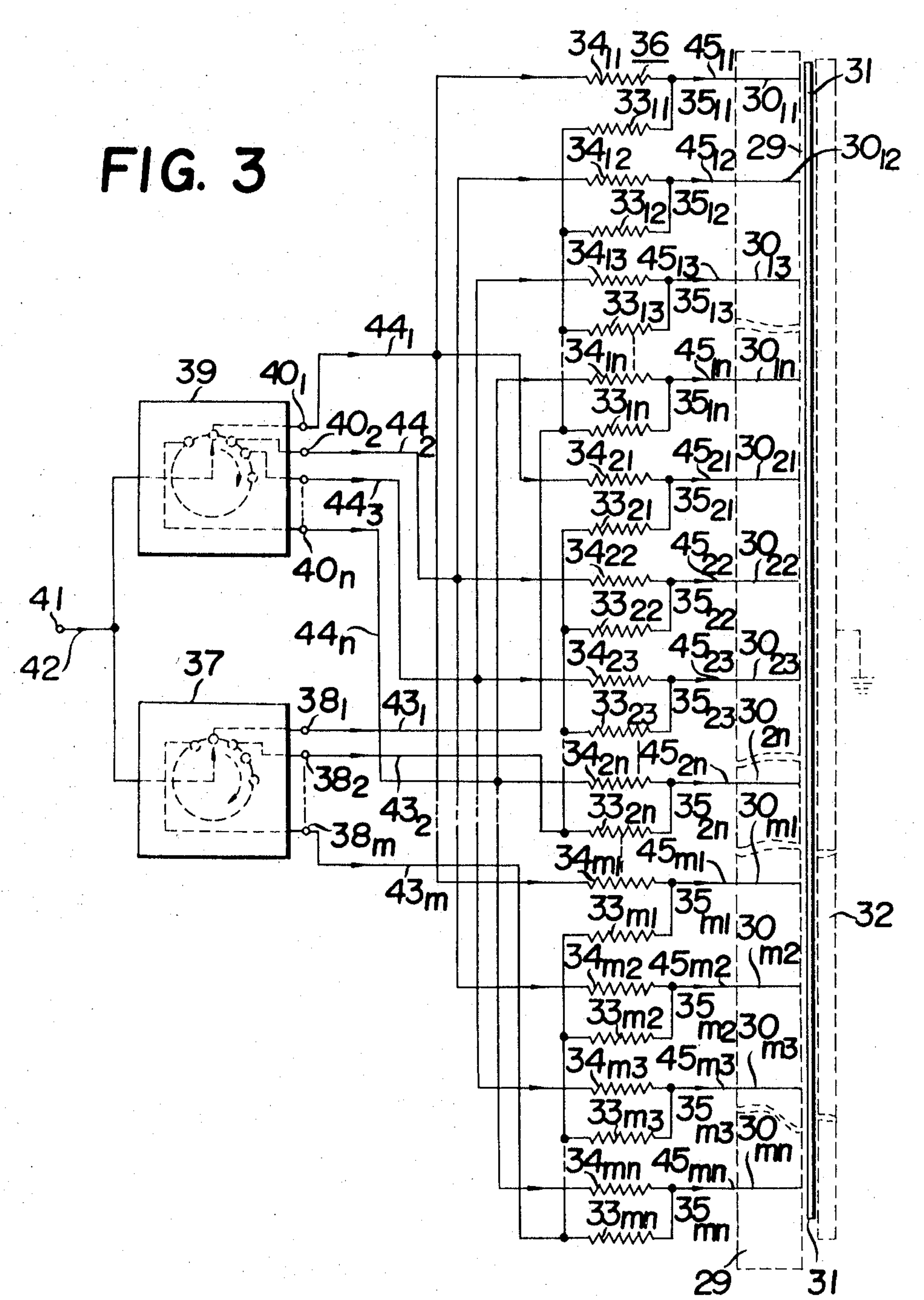
Figures 4A, 4B, 4C:
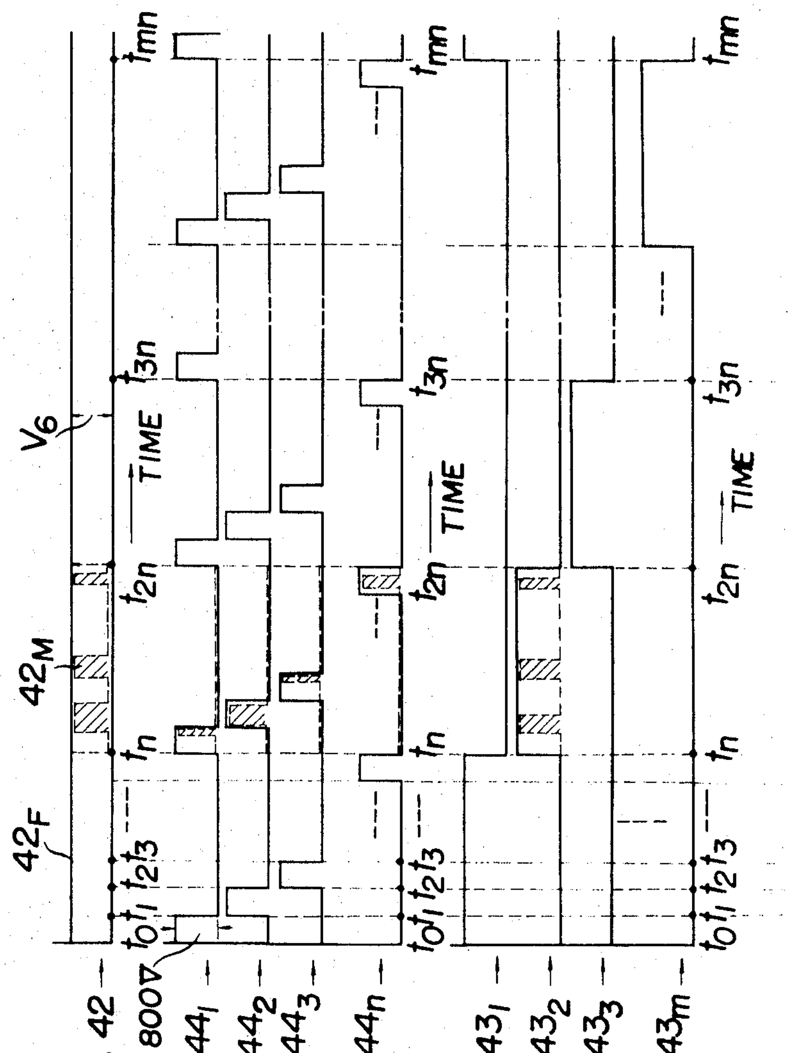
Figure 4D:
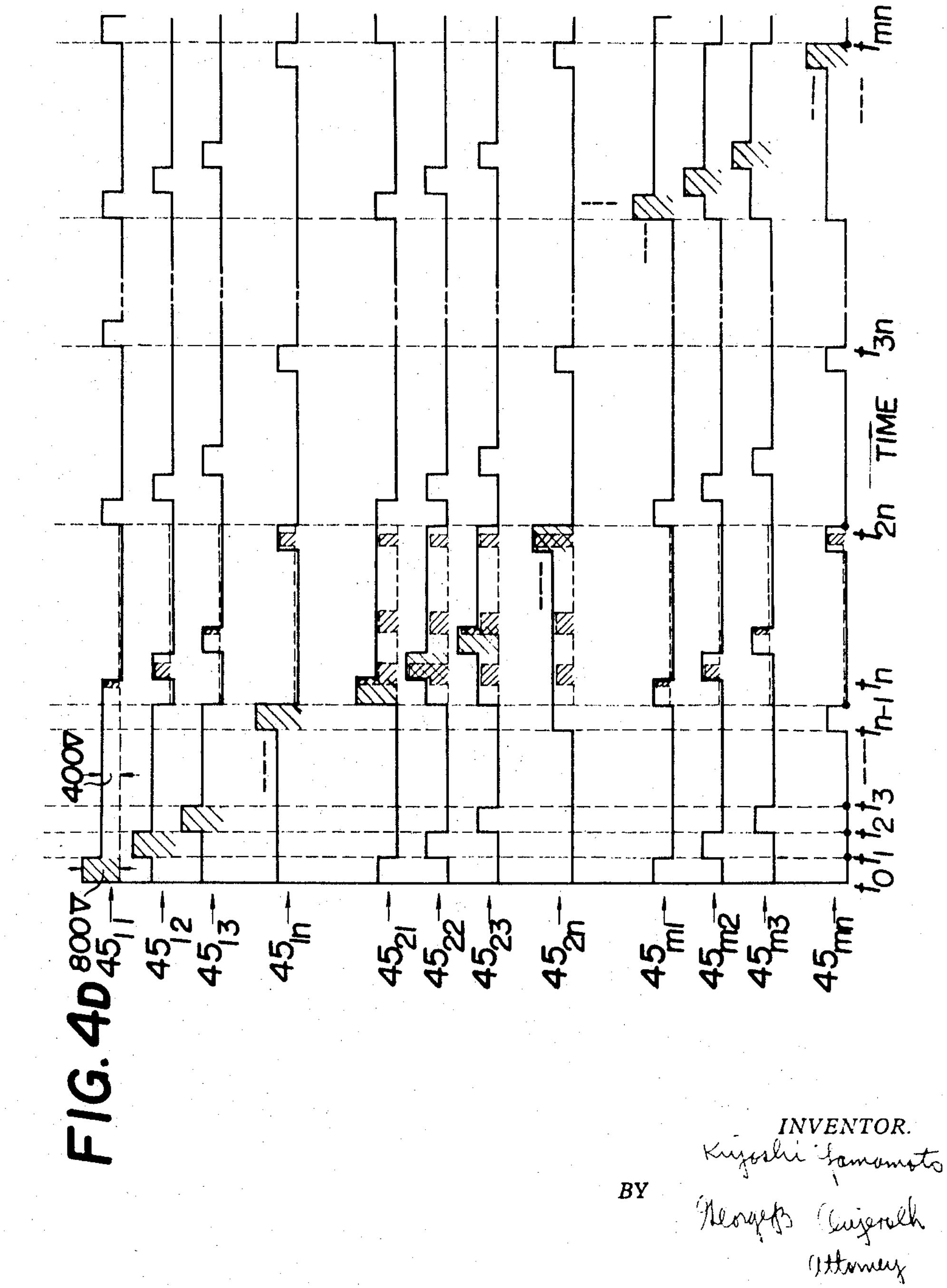

FIG. 3 shows a circuit arrangement of components associated with the electrodes when one example of the novel system is applied to a facsimile receiver; and FIG. 4 shows waveforms of various components for the purpose of explaining the operation of the circuit shown in FIG. 3, wherein FIG. 4A shows waveforms of facsimile signals for transmitting pictures; FIG. 4B shows waveforms of outputs from a second high voltage pulse generator; FIG. 4C shows waveforms of the outputs of a first high voltage pulse generator; and FIG. 4D shows waveforms of pulse signals impressed upon respective needle electrodes.

In order to record clear electrostatic latent images on an electrostatic recording film including an electrostatic recording sheet, a high resistance resinous film, a resinous film backed with an electric conductive layer, etc., it is necessary to impress a high voltage pulse of more than about 600 v. between the fore electrode or needle electrodes and the back electrode. When this voltage is decreased below about 400 v., no electrostatic latent image would be recorded. Accordingly it is common to use a high voltage pulse having a crest value of about 800 v. for recording. The invention utilizes a particular property of electrostatic recording that electrostatic latent images of satisfactory tone could be recorded by utilizing high voltage pulse signals exceeding about 600 v., whereas no satisfactory electrostatic latent image could be formed with high voltage pulse signals of less than about 400 v. More specifically to utilize such a characteristic a resistance coupling circuit comprising two resistors which are coupled each other is connected to the needle electrodes and high voltage pulse signals of the same polarity are supplied to said two resistors from a pair of high voltage pulse generators, thus controlling the applied voltages to needle electrodes.

Referring now to the accompanying drawings, the principle of this invention will be considered hereunder by referring to FIG. 1. For the sake of brevity, only the component elements required for the control of one needle electrode are shown in the figure. A needle electrode 12 is embedded in an electrode holder 11 made of an electric insulator and held in close proximity to the recording surface of an electrostatic recording film 10. On the back of the film is disposed a back electrode 13 to oppose the needle electrode, said back electrode being maintained at a reference potential, for example, the ground potential. One end of a resistor 14 is electrically connected to the inner end of the needle electrode, and one end of a second resistor 15 is also connected to the needle electrode to form a resistance coupling circuit 16. The resistors 14 and 15 are constructed to have the same resistance value, for example, about 1 megohm, so that the impedance of the electrode 12 as viewed from the side of the coupling circuit 16 is very high. The opposite ends of the resistors 14 and 15 of the resistance coupling circuit 16 are respectively connected to output terminals 19 and 20 of a pair of high voltage pulse signal generators 17 and 18. Across the output terminals of the first high voltage pulse signal generating device 17 is applied a first high voltage pulse signal $P_1$ having a crest value of about 800 v., as shown in FIG. 2, whereas a second high voltage pulse signal $P_2$ having a crest value of about 800 v. and of the same polarity as the signal $P_1$ appears at the output terminal 20 of the second high voltage signal generating device 18. These pulse signals $P_1$ and $P_2$ are combined into a pulse signal $P_3$ of the waveform shown in FIG. 2, by the action of the resistance coupling circuit 16. As is shown by the following Equation 1 the crest value $V\alpha$ of voltage during the interval of $t_1$–$t_2$ in which pulse signals $P_1$ and $P_2$ are simultaneously impressed across the first and the second resistors 14, 15, respectively, would be approximately 800 v. which is of course a value to assure satisfactory electrostatic recording.

$$Va=\frac{V_1+V_2}{2}\doteqdot V_1 \quad (1)$$

Further, the crest value $Vb$ during time intervals $t_0$–$t_1$, $t_2$–$t_3$ and $t_4$–$t_5$ in which a pulse signal $P_1$ or $P_2$ is impressed upon either one of the resistors of the resistance coupling circuit will be reduced to about one half of $V_1$ or $V_2$, as shown by the following Equation 2 or about 400 v. in the illustrated example, which is insufficient to form satisfactory electrostatic recording.

$$Vb\doteqdot\frac{V_2}{2}\doteqdot\frac{V_1}{2} \quad (2)$$

Figure 1A:
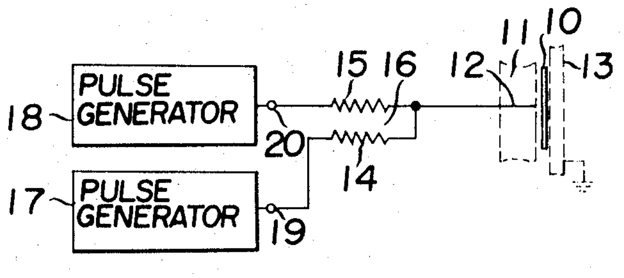
FIG. 1A is a diagram illustrating the minimum number of circuit components of the novel system which are required to explain the principle of this invention.
Figure 2:
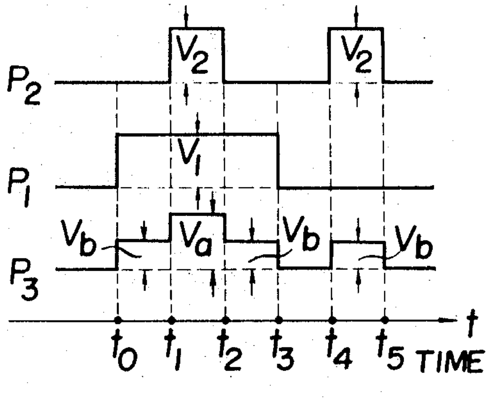
FIG. 2 shows waveforms of various components to explain the operation of the systems shown in FIGS. 1A and 1B.

As shown in FIG. 1A when the resistance values of resistors 14 and 15 are made equal and the impedance value of the needle electrode 12 as seen from the resistors is made extremely high, only when pulse signals are impressed simultaneously across both resistors 14 and 15 as above mentioned, a high voltage pulse signal could be obtained having a magnitude equal to the crest value of said pulse signals and hence capable of forming satisfactory electrostatic records. On the contrary where the pulse signal is impressed upon only one resistor, the pulse signal obtained would have a crest value equal to one half of that of the impressed signal which is insufficient to form any electrostatic record. Thus, it will be understood by those skilled in the art that it is readily possible to control the needle electrodes between recordable and non-recordable conditions by providing a pair of high voltage pulse signal generators 17, 18 which generate the first and the second high voltage pulse signals having the same polarity and equal crest value, and by controlling the instants at which these signals are generated.

Figure 1B:
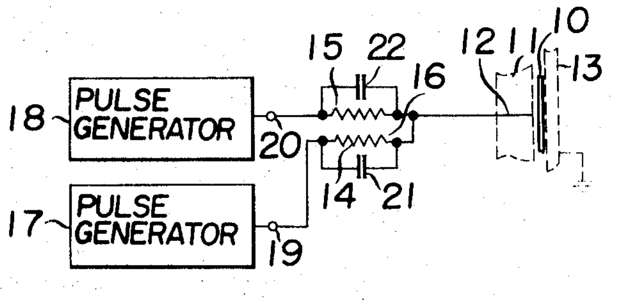
FIG. 1B is a similar view as FIG. 1A wherein capacitance is added to a resistance coupling circuit which is one of the essential circuit components required for the novel system.

Due to the stray capacitance between said first and second resistors and the ground there is a fear that the waveforms of high voltage pulse signals passing through these resistors are deformed and their amplitudes are attenuated. Such a defect could be obviated and thus the transmission characteristics of the high voltage pulse signals could be improved by connecting capacitors 21 and 22, respectively in parallel with resistors 14 and 15 to compensate for the stray capacitance. In FIGS. 1A and 1B corresponding parts are indicated by the same reference numerals.

One embodiment of this invention will be described in detail by referring to FIG. 3 which shows a diagrammatic connection circuit of this invention which is applicable to facsimile receivers. The fore electrode comprises N conductive needle electrodes $30_{11}$ . . . $30_{mn}$ which are embedded along a straight line in an electrode holder 29 made of a suitable electric insulator with their outer ends exposed. These needle electrodes are equally spaced and their density is of the order of 4 to 6 per millimeter. Usually N is equal to about 400 to 600. An electrostatic recording film 31 is provided with its recording surface in contact with the needle electrodes $30_{11}$ . . . $30_{mn}$, said film 31 being moved in a direction perpendicular to the plane of the drawing to provide sub-scanning. A single back electrode 32 is provided to oppose all of the needle electrodes $30_{11}$ to $30_{mn}$ with the recording film interposed between the fore and back electrodes, said back electrode 32 being normally maintained at a reference potential, for example the ground potential. Each needle electrodes $30_{11}$ . . . $30_{mn}$ is connected to one terminal of each of the first resistors $33_{11}$ . . . $33_{mn}$, and one terminal of the second resistors $34_{11}$ . . . $34_{mn}$, are also connected to respective needle electrodes. Thus, for each of said needle electrodes, one of resistance coupling circuits $35_{11}$ . . . $35_{mn}$, each consisting of one of said first resistors and one of said second resistors is associated and these circuits comprise N resistance coupling networks 36. As already described in connection with FIG. 1B, a capacitor for compensating the pulse transmission characteristic may be added to the resistance coupling network 36. In this case, capacitors are connected respectively in parallel with the first resistors $33_{11}$ . . . $33_{mn}$ and the second resistors $34_{11}$ . . . $34_{mn}$. Needle electrodes are arranged into groups, according to their order of arrangement, one group consisting of $n$ needle electrodes, thus forming the total of $m$ groups. It is of course to be understood that the number of N of the needle electrodes $30_{11}$ . . . $30_{mn}$ is selected so that N equals $m \cdot n$. The first resistors connected to respective groups of needle electrodes $30_{11}$, $30_{12}$ . . . $30_{1n}$ . . . ; $30_{m1}$, $30_{m2}$ . . . $30_{mn}$ are also grouped and the other ends of the resistors of respective groups such as $33_{11}$, $33_{12}$ . . . $33_{1n}$ . . . ; $33_{m1}$, $33_{m2}$ . . . $33_{mn}$ are respectively connected together and the common junctions of respective groups are connected to output terminals $38_1$ . . . $38_m$, respectively of a first high voltage pulse generator 37. Respective groups of resistors of the second reesistors $34_{m1}$ . . . $34_{mn}$, such as $34_{11}$, $34_{21}$ . . . $34_{m1}$ . . . ; $34_{1n}$, $34_{2n}$ . . . $34_{mn}$ are also connected in common, said groups being spaced by $n$ needle electrodes according to the order of arrangement thereof, and being respectively connected to the output terminals $40_1$ . . . $40_n$ of a second high voltage pulse generator 39. As shown in the drawing the first high voltage pulse generating device 37 includes $m$ output terminals $38_1$, $38_2$ . . . $38_m$, while the second high voltage pulse generating device 39 includes $n$ output terminals $40_1$, $40_2$ . . . $40_n$. The input sides of a pair of high voltage pulse generators 37 and 39 are connected to a facsimile signal input terminal 41, which is arranged to receive facsimile signals which are modulated by full marks, picture images, characters, or symbols, as shown in FIG. 4.

The details of the high voltage pulse generators 37 and 39 will now be considered. As has been already pointed out, the numbers of output terminals of these generators are $m$ and $n$, respectively and these numbers are selected such that the product of $m$ by $n$ will be equal to N. For example, if it is assumed that N equals 440, then the relation would be such that $n$ equals 40 and $m$ equals 11. The first high voltage pulse generator 37 is so constructed that it will divide a facsimile signal applied to the input terminal 41 and corresponding to one main scanning period into $m$ equal portions and to sequentially supply these $m$ facsimile signal components to terminals $38_1$ . . . $38_m$. However, as the facsimile signal introduced into the terminal 41 has a low crest value which is not sufficient to provide satisfactory electrostatic recording, it is advantageous to provide for the pulse generator 37 a suitable high voltage pulse amplifier which functions to amplify the received facsimile signal to have a crest value of approximately 800 v.

The function of the high voltage pulse generator 37 described above can be provided either mechanically or electronically. In a mechanical construction $m$ contact terminals which are respectively connected to corresponding $m$ output terminals $38_1$ . . . $38_m$ are arranged, at equal spacings, on concentric circles, and a rotary contact arm electrically connected to the input terminal 41 is provided to make one revolution per one main scanning whereby the rotary contact arm comes to sequentially contact with $m$ contact terminals. With such a mechanical construction, one high voltage pulse amplifier adapted to amplify received facsimile signals to a high voltage is included in the first stage on the input side of the high voltage pulse generator. Where the high voltage pulse generator 37 is comprised by electronic circuits a signal distributor circuit is constructed by a plurality of flip-flop circuits and AND gate circuits employing semi-conductor diode elements. This circuit functions to divide a length of a facsimile signal corresponding to one main scanning into $m$ equal portions with regard to time and then to sequentially supply these divided portions of the facsimile signal to output terminals $38_1$ . . . $38_m$. It is to be understood that each of $m$ high voltage pulse amplifiers is included between said distributor circuit and each of said output terminals $38_1$ . . . $38_m$ to amplify the facsimile signal to a voltage of the crest value of 800 v. and then supply it to the output terminals $38_1$ . . . $38_m$.

The second high voltage pulse generator 39 functions to divide a length of a facsimile signal applied to the terminal 41 and corresponding to one main scanning into $m$ equal portions and then to divide said signal which has been divided into $m$ equal portions, into $n$ equal portions and to sequentially distribute these divided portions to output terminals $40_1$ . . . $40_n$. Similar to the first generator 37, the second high voltage pulse generator 39 is also provided with a suitable high voltage pulse amplifier which amplifies the received facsimile signal to a voltage having a crest value of approximately 800 v. The second generator 39 can also be constructed either mechanically or electronically. In the case of mechanical construction, $n$ contact terminals respectively connected to corresponding one of $n$ output terminals $40_1$ . . . $40_n$ are arranged at equal spacings on concentric circles and a rotary contact arm electrically connected to the input terminal 41 is rotated at a speed of $m$ revolutions per one main scanning to sequentially contact with $n$ contact terminals. On the other hand, where the generator is comprised by electronic circuits, again it can be constructed from a suitable combination of flip-flop circuits and AND gate circuits including diode elements. In the former case it is required to provide one, but in the latter case, $n$ high voltage pulse amplifiers.

As is well known in the art in a multi-needle electrode type electrostatic recording device constructed to be utilized as the conventional facsimile receiver, only one high voltage pulse generator has been used in order to distribute facsimile signal among the total of N needle electrodes. Accordingly such a high voltage pulse generator has been required to have N output terminals respectively connected to N needle electrodes thereby to divide a length of a facsimile signal introduced from the input terminal and corresponding to one main scanning into N equal portions and to distribute these divided high voltage pulse signal portions among the output terminals. Heretofore where such a high voltage pulse generator is constructed mechanically, although the high voltage pulse amplifier may be only one it is required to arrange at equal spacings N, for example 440, contact terminals on concentric rings.

Such a construction is not only very difficult to fabricate but also increases the physical dimensions of the distributor mechanism so that it is uneconomical to be used in practice. Further where the high voltage pulse generator is constructed by electronic circuits it becomes necessary to utilize N high voltage pulse amplifiers, thus resulting in complication as well as high cost of the circuit.

In contrast, according to this invention it is only required to distribute the signal among $m$ and $n$ output terminals, there being a relation $m \cdot n = N$ between $m$ and $n$. It is practically effective to select the numbers of output terminals $m$ and $n$ to a value close to $\sqrt{N}$. In the embodiment shown in FIG. 3 the high voltage pulse generators 37 and 39 may be of either mechanical or electronic construction, and they are shown diagrammatically by dotted lines as rotary change-over switches for the sake of understanding. It is also to be understood that the high voltage pulse amplifiers are included in each of the high voltage pulse generators 37 and 39.

The operation of the components associated with needle electrodes and constructed and arranged as above described will be described hereunder by referring to waveforms shown in FIG. 4. The time phases represented by the abscissas of FIGS. 4A to 4D inclusive are synchronized and the amplitude scales of pulses represented by the ordinates are the same for FIGS. 4B, 4C and 4D except that a somewhat enlarged scale is used in FIG. 4A.

In order to have a better understanding it is firstly supposed that a full mark fascimile signal $\mathbf{42}_F$ having a constant amplitude $V_6$ is introduced into the input terminal 41. It is determined that a length of the fascimile signal $\mathbf{42}_F$ from a time instant $t_0$ to $t_{mn}$ corresponds to one main scanning. Then the first high voltage pulse generating device 37 will divide the facsimile signal $\mathbf{42}_F$ into $m$ equal portions during one main scanning period, amplify the divided signal to have a crest value of about 800 v. and therafter distribute these portions among output terminals $\mathbf{38}_1$, $\mathbf{38}_2$ . . . $\mathbf{38}_m$ as the first high voltages pulse signals $\mathbf{43}_1$, $\mathbf{43}_2$ . . . $\mathbf{43}_m$. On the other hand the second high voltage pulse signal generator 39 will function to divide a length of the facsimile signal $\mathbf{42}_F$ corresponding to one main scanning into equal portions and then subdivide them into $n$ equal portions, amplify these portions to have a crest value of about 800 v., and then apply them to output terminals $\mathbf{40}_1$, $\mathbf{40}_2$ . . . $\mathbf{40}_n$ as the second high voltage pulse signals $\mathbf{44}_1$, $\mathbf{44}_2$ . . . $\mathbf{44}_n$. Thus, the first high voltage pulse signals $\mathbf{43}_1$, $\mathbf{43}_2$ . . . $\mathbf{43}_m$ are respectively supplied to groups of first resistors $\mathbf{33}_{11}$, $\mathbf{33}_{12}$ . . . $\mathbf{33}_{1n}$ . . . ; $\mathbf{33}_{m1}$, $\mathbf{33}_{m2}$ . . . $\mathbf{33}_{mn}$ which are respectively connected to groups of needle electrodes $\mathbf{30}_{11}$, $\mathbf{30}_{12}$ . . . $\mathbf{30}_{1n}$ . . . ; $\mathbf{30}_{m1}$, $\mathbf{30}_{m2}$ . . . $\mathbf{30}_{mn}$. The second high voltage pulse signals $\mathbf{44}_1$, $\mathbf{44}_2$ . . . $\mathbf{44}_n$ are respectively supplied to groups of second resistors $\mathbf{34}_{11}$ . . . $\mathbf{34}_{m1}$ . . . ; $\mathbf{34}_{1n}$ . . . $\mathbf{34}_{mn}$, each group being spaced by $n$ needle electrodes according to the order of arrangement thereof. Considering now a first high voltage pulse signal $\mathbf{43}_1$ and a second high voltage pulse signal $\mathbf{44}_1$, for example, when these signals $\mathbf{43}_1$, $\mathbf{44}_1$ are impressed across respective resistors $\mathbf{33}_{11}$ and $\mathbf{34}_{11}$ of a first resistance coupling network $\mathbf{35}_{11}$, then a pulse signal $\mathbf{45}_{11}$ as shown in FIG. 4D will be impressed to the first needle electrode $\mathbf{30}_{11}$. In other words, since both pulse signals $\mathbf{43}_1$ and $\mathbf{44}_1$ are simultaneously impressed across resistors $\mathbf{33}_{11}$ and $\mathbf{34}_{11}$ only during the period of $t_0$–$t_1$, these signals will be combined into a resultant pulse signal having a crest value of 800 v. During a period of $t_1$ to $t_n$ since only the first high voltage pulse signal $\mathbf{43}_1$ is impressed a resultant pulse signal of a crest value of 400 v. will be resulted. Accordingly during the period of from $t_0$ to $t_n$, the needle electrode $\mathbf{30}_{11}$ will form an electrostatic latent image on the electrostatic recording film 31 only during the interval of from the instant $t_0$ to the instant $t_1$. Similarly, a first high voltage pulse signal $\mathbf{43}_2$ and a second high voltage pulse signal $\mathbf{44}_2$ will be impressed upon the second needle electrode $\mathbf{30}_{12}$ to produce a resultant pulse signal having a crest value of 800 v. during the interval of $t_1$ to $t_2$, thus recording an electrostatic latent image. Since the crest value of the resultant signal during the periods of $t_0$–$t_1$ and $t_2$–$t_n$ is only 400 v., no record will be made. In the same manner, the needle electrode $\mathbf{30}_{13}$ is capable of recording the electrostatic latent image only during a period of $t_2$–$t_3$ while the needle electrode $\mathbf{30}_{1n}$ only during the period of $t_{n-1}$–$t_n$. As shown in the drawing needle electrodes $\mathbf{30}_{21}$, $\mathbf{30}_{22}$ . . . $\mathbf{30}_{2n}$ belonging to the second group are also sequentially supplied with pulse signals of a crest value of 800 v. The same is true with regard to needle electrodes $\mathbf{30}_{m1}$, $\mathbf{30}_{m2}$ . . . $\mathbf{30}_{mn}$ which belong to the group $m$. Accordingly, needle electrodes $\mathbf{30}_{11}$ . . . $\mathbf{30}_{mn}$ are sequentially supplied with pulse signal voltages having a crest value of 800 v. which are shaded with lines inclining towards lower left portions as shown in FIG. 4D, thus forming an electrostatic image. As a result, on the recording surface of the electrostatic recording film 31 will be formed linear electrostatic images in the transverse direction of the film and one main scanning will be completed during the period of $t_0$ to $t_{mn}$. It is to be understood that the recording film 31 moves slowly in a direction perpendicular to the surface of the drawing thus effecting sub-scanning. Thus, so long as a full mark facsimile signal $\mathbf{42}_F$ as shown in FIG. 4A is applied to the input terminals 41, an electrostatic record will be made over the entire surface of the recording film 31.

It is now assumed that a facsimile signal $\mathbf{42}_M$ modulated by a picture is impressed upon the input terminal 41. To compare this case with the case of a full mark, the modulated facsimile signal $\mathbf{42}_M$ is represented to be overlapped during the period of from $t_n$ to $t_{2n}$ in FIG. 4A. In this figure the facsimile signal $\mathbf{42}_M$ modulated by a picture is represented by dotted lines and shaded with lines towards lower right portions. It is to be understood that, actually the modulated facsimile signal $\mathbf{42}_M$ will be present during a period of from $t_0$ to $t_{mn}$, for the sake of brevity it is shown only during a period of from $t_n$ to $t_{2n}$. The facsimile signal $\mathbf{42}_M$ will be derived by the action of the first high voltage pulse signal generating device 37 during an interval of from $t_n$ to $t_{2n}$ which corresponds to $1/m$ of one main scanning and supplied through the output terminal $\mathbf{38}_2$. On the other hand, as shown in FIG. 4B, the facsimile signal $\mathbf{42}_M$ will be sequentially supplied to output terminals $\mathbf{40}_1$, $\mathbf{40}_2$ . . . $\mathbf{40}_n$ by the action of the second high voltage pulse signal generating device 39. Since the facsimile signal $\mathbf{42}_M$ is derived of the output terminal $\mathbf{38}_2$, pulse signals to be impressed upon needle electrodes $\mathbf{30}_{21}$, $\mathbf{30}_{22}$ . . . $\mathbf{30}_{2n}$ belonging to the second group will be considered hereunder. These needle electrodes $\mathbf{30}_{21}$ . . . $\mathbf{30}_{2n}$ are impressed with pulse signals $\mathbf{45}_{21}$, $\mathbf{45}_{22}$ . . . $\mathbf{45}_{2n}$ which are shaded with lines towards lower right hand portions in FIG. 4D. However, of these signals, the portion that has a crest value of 800 v. which is sufficient to form electrostatic recording is the portion having a narrow pulse width and is represented as being overlapped with the signal with a shading toward the lower left. In this maner, the needle electrodes $\mathbf{30}_{21}$ . . . $\mathbf{30}_{2n}$ are impressed with a high voltage impulse signal of 800 v. for an interval corresponding to the facsimile signal modulated by a picture or pattern thereby forming an electrostatic latent image on the recording surface of the recording film 31.

With regard to FIG. 4D, it is particularly to be pointed out that where the needle electrodes $\mathbf{30}_{11}$ . . . $\mathbf{30}_{mn}$ are impressed with either a full mark facsimile signal or a facsimile signal modulated by a picture, the voltage difference between any two adjacent needle electrodes $\mathbf{30}_{11}$ . . . $\mathbf{30}_{mn}$ is only 400 v. However, the potential difference between the first electrode of one group, for example $\mathbf{30}_{1n}$, and the first electrode of another group, for example $\mathbf{30}_{21}$, may reach 800 v. Stated in another way, since the maximum potential difference between any two adjacent needle electrodes $\mathbf{30}_{11}$ . . . $\mathbf{30}_{mn}$ is only 400 v., it is not required to make the electrode holder 29 in which these electrodes are embedded with an electric insulator having high insulating strength as in the previous construction. However, portions between the adjacent groups should have high insulating strength. In the prior art needle electrode control systems the potential difference between a needle electrode which is being impressed with the received signal and an electrode adjacent thereto has amounted to a much higher value, for example, 800 to 1000 v. As a result there was a danger of striking an electric discharge between adjacent needle electrodes and the electrode holder should have sufficiently high insulating strength. In contrast, in the electrode control system embodying this invention the voltage difference between any two adjacent needle electrodes is at most 400 v. mainly due to the fact that the needle electrodes are controlled by pulse signals of a pair of high voltage pulse generators 37 and 39 via a resistance coupling circuit 35 comprising a combination of a first and a second resistor 33 and 34. It is believed that this can be more clearly understood by referring to waveforms illustrated in FIG. 2.

From the foregoing description it will be clear that, in accordance with this invention it is possible to accurately control each needle electrode by connecting one end of a pair of resistors to said needle and by connecting the other ends of these resistors to a pair of high voltage pulse generators.

What is claimed is:

1. An electrode control system of a multi-electrode type electrostatic recording device comprising a plurality of needle electrodes disposed in close proximity to the recording surface of an electrostatic recording film to form an electrostatic record on said recording surface, said needle electrodes being uniformly spaced and arranged in a straight line; a single back electrode common to said plurality of needle electrodes and disposed to face said needle electrodes with said electrostatic recording film interposed therebetween, said back electrode being maintained at a reference potential; a resistance coupling network including a plurality of first resistors and a plurality of second resistors, said first and second resistors forming pairs corresponding to said needle electrodes, one end of each pair of said first and second resistors being connected to the corresponding needle electrode; means to connect together the other ends of a predetermined number of said first resistors of said network to form a plurality of groups according to the order of arrangement of said needle electrodes; means to connect together the other ends of said second resistors of said network which are spaced apart by said predetermined numbers according to the order of arrangement of said needle electrodes; a first high voltage pulse generating means to successively distribute and impress a high voltage pulse for recording to the common junctions of said first resistance groups to cause said plurality of needle electrodes to effect the main scanning function; a second high voltage pulse signal generating means to successively distribute a high voltage pulse for electrostatic recording to the other terminals of said second resistors at a higher speed than said first high voltage pulse generating means thereby to impress said high voltage pulse for electrostatic recording to said needle electrodes; and means to simultaneously apply a facsimile signal both to said first and second high voltage pulse generating means thereby to divide said facsimile signal among said first and second high voltage pulse generating means and impress it to said plurality of needle electrodes as the high voltage pulse signal for electrostatic recording through said resistance network and at said different distributing speeds thus causing the needle electrodes to which said high voltage pulse signal have been impressed simultaneously from said first and second pulse generating means to record an electrostatic latent image on said recording film.

2. The system according to claim 1 wherein condensers are connected in parallel respectively with said first and second resistors of said resistance coupling network.

References Cited

UNITED STATES PATENTS

| | | | |
|---|---|---|---|
| 2,930,847 | 3/1960 | Metzger | 178—30 |
| 3,068,479 | 12/1962 | Benn | 346—74 |
| 3,071,646 | 1/1963 | Dew | 346—74 |
| 3,091,762 | 5/1963 | Schwertz | 346—74 |
| 3,160,091 | 12/1964 | Schwertz | 346—74 |
| 3,208,076 | 9/1965 | Mott | 346—74 |
| 3,384,898 | 5/1968 | Macovski | 346—74 |

BERNARD KONICK, Primary Examiner

L. J. SCHROEDER, Assistant Examiner

U.S. Cl. X.R.

346—74